Figure 1:
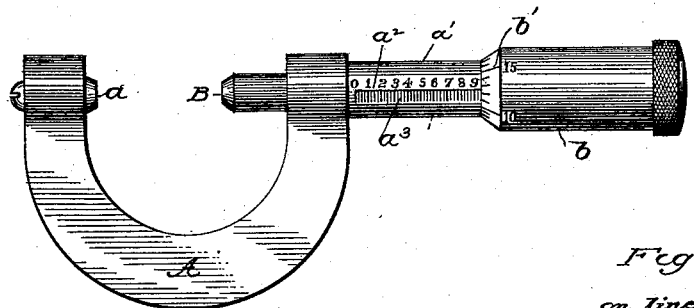

(No Model.)

G. THOMPSON.
MICROMETER GAGE.

No. 571,178.  Patented Nov. 10, 1896.

on line x-x

Witnesses:
Robert T. Morrow
G. D. Morrow

Inventor:
George Thompson

UNITED STATES PATENT OFFICE.

GEORGE THOMPSON, OF CLEVELAND, OHIO.

MICROMETER-GAGE.

SPECIFICATION forming part of Letters Patent No. 571,178, dated November 10, 1896.

Application filed February 17, 1888. Renewed April 10, 1896. Serial No. 587,035. (No model.)

*To all whom it may concern:*

Be it known that I, GEORGE THOMPSON, a citizen of the United States, residing at Cleveland, Cuyahoga County, Ohio, have invented a certain new and useful Improvement in Micrometer-Gages, of which the following is a full, clear, and exact specification, reference being had to the accompanying drawings, forming a part hereof.

My invention has reference more particularly to that familiar type of gage in which a threaded spindle is inserted through one end of a U-shaped body and the distance measured between the end of the spindle and the opposite ends of the body, the spindle being provided at its outer end with a graduated sleeve, which incloses and is read in connection with a graduated neck on the body. It is the universal practice both in America and Europe to graduate these instruments according to the decimal system to read thousandths of an inch, the spindles being provided with forty threads to the inch and the circumference of the sleeve divided into twenty-five parts. A further subdivision of the graduations has been found impracticable, for the reason that it is difficult to read them with the naked eye and because their fineness leads to confusion and error of adjustment. Now in modern shop practice nearly all work is done from drawings having dimensions marked thereon, and in these drawings it is the constant practice to indicate the dimensions in part in accordance with the decimal plan and in part in sixteenths of an inch. The latter designations are generally used in connection with those parts which are to be formed by standard tools, such as are commonly sold in the market and which are ordinarily constructed in accordance with a scale of sixteenths of an inch. In order that micrometers graduated on the decimal plan may be used for measuring sixteenths, it is the practice to stamp upon their bodies an extensive table indicating the decimal equivalents of sixteenths. As the even numbers of sixteenths, such as two-sixteenths, four-sixteenths, six-sixteenths, &c., are represented by a whole number of thousandths they can be accurately measured, although care and trouble are required, but as the uneven sixteenths, as one-sixteenth, three-sixteenths, five-sixteenths, &c., are represented by decimals terminating in fractional thousandths it is exceedingly difficult to read them, and as the instrument is not graduated below thousandths the workman is compelled to rely upon the accuracy of his eye in adjusting the gage. In practice this is found both troublesome and unreliable, the variations which are liable to occur being frequently such as to cause a misfit.

Now the object of my invention is to provide a simple means by which the workman may instantly and accurately measure the odd sixteenths of an inch on a micrometer graduated as usual on the decimal plan; and to this end it consists, essentially, in providing the neck around which the graduated sleeve revolves with a second longitudinal line diametrically opposite the line on which the thousandths are read, and also in providing the neck on the rear side with transverse lines or numbers indicating the odd sixteenths, to be read in connection with the end of the sleeve. With the exception of these graduations the instrument may be in all respects of the ordinary construction.

Figure 4:
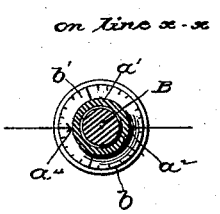
Figure 2:
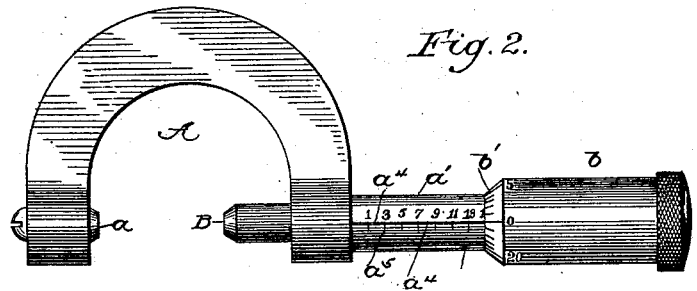
Figure 3:
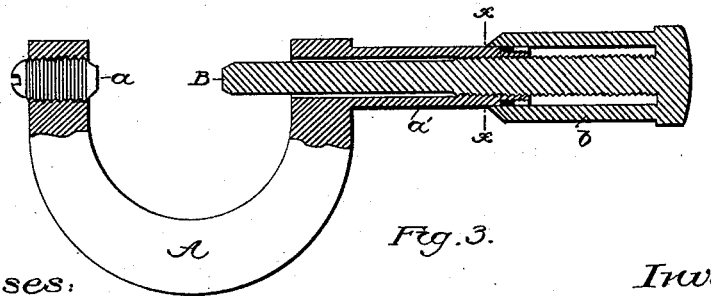

In the accompanying drawings, Figure 1 is a side view of an ordinary gage, showing the usual graduations on one side for reading thousandths of an inch. Fig. 2 is a view of the opposite side of the gage, showing the additional line of graduations which I have applied to facilitate the reading of the odd sixteenths and the subdivision of thousandths. Fig. 3 is a longitudinal central section of the gage. Fig. 4 is a cross-section of the same on the line $xx$.

Referring to the drawings, A represents the U-shaped body, provided at one end with the bearing-face $a$ and at the other with the projecting internally-threaded neck $a'$.

B represents the measuring-spindle, threaded through the neck and fixed at the outer end within the sleeve $b$, which passes with a rotary and longitudinal motion over the neck. The neck is provided on one side with the longitudinal line $a^2$, known as the "zero-line," and with transverse graduations $a^3$, representing fortieths of an inch. The end of the sleeve is divided circumferentially into twenty-five equal parts by longitudinal lines $b'$, numbered in regular order. The above graduations enable the workman to read thousandths of an inch, and are all that are usually employed. They do not, however, permit the exact reading of uneven sixteenths or other measurements including a fraction of a thousandth.

In applying my improvement I provide the neck $a'$, at a point diametrically opposite the zero-line $a^2$, with a second longitudinal line, $a^4$, to be read in connection with the graduations on the end of the sleeve. I also provide the neck with transverse graduations $a^5$, intersecting the line $a^4$. These transverse lines are an eighth of an inch apart and represent the odd sixteenths of an inch. When therefore it is required to measure three, five, or any other uneven number of sixteenths it is only necessary to turn the sleeve until its end coincides with the appropriate line $a^5$ and its zero-mark coincides with line $a^4$. In this manner the necessity of consulting a decimal table is avoided and the instrument adjusted accurately and positively to the odd half-thousandth of an inch, or, in other words, to include the two-thousandth part of an inch which is included in the sixteenth.

The transverse lines $a^5$, although advantageous, are not necessary, provided the numerals indicating the number of sixteenths are placed at the proper points along the line $a^4$, so that the operator has only to bring the end of the sleeve in line with the numeral and the zero-mark to the line $a^4$.

The line $a^4$ is not only advantageous in the reading of sixteenths of an inch, but also in subdivided thousandths, as the instrument will always indicate an odd half-thousandth whenever one of the longitudinal lines on the sleeve coincides with the line $a^4$.

I am aware that gages and other instruments have been variously provided with two or more independent scales or graduations and that supplemental devices have been variously applied to micrometer-gages in order to facilitate the reading of thirty-seconds of an inch and other distances which involve the subdivision of thousandths, but I believe myself to be the first to provide a micrometer-gage of the type herein shown with the two series of graduations on opposite sides of one and the same neck, both adapted to be read in connection with a single set of graduations on a sleeve.

Having thus described my invention, what I claim is—

1. In a micrometer-gage of the type herein described and shown, the circumferentially-graduated sleeve attached to the threaded measuring-spindle, in combination with the stationary neck having on diametrically opposite points two longitudinal lines, one graduated for the reading of thousandths of an inch, the other graduated for the reading of odd sixteenths of an inch.

2. In a micrometer-gage of the type herein described and shown, the threaded spindle and its adjusting-sleeve divided circumferentially into twenty-five equal parts, in combination with the frame having the neck provided with the two longitudinal lines at diametrically opposite points.

3. The micrometer-gage consisting of the U-shaped body, having the internally-threaded neck, the measuring-spindle, the sleeve attached to said spindle, the circumferential graduations on the end of the sleeve, the two longitudinal lines at diametrically opposite points on the neck, one of said lines graduated for the reading of thousandths of an inch, the other graduated and numbered to indicate the odd sixteenths of an inch.

GEORGE THOMPSON.

Witnesses:
ROBERT T. MORROW,
F. D. MORROW.